(12) United States Patent
Wang et al.

(10) Patent No.: US 12,223,671 B2
(45) Date of Patent: Feb. 11, 2025

(54) UNMANNED AERIAL VEHICLE AND DIMMING DEVICE FOR A SWITCHABLE GLASS

(71) Applicants: Beijing BOE Sensor Technology Co., Ltd., Beijing (CN); BOE TECHNOLOGY GROUP CO., LTD., Beijing (CN)

(72) Inventors: Yongbo Wang, Beijing (CN); Chen Meng, Beijing (CN); Yutao Tang, Beijing (CN); Xiaotian Pang, Beijing (CN); Zhong Hu, Beijing (CN); Qinhao Piao, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 541 days.

(21) Appl. No.: 17/466,003

(22) Filed: Sep. 3, 2021

(65) Prior Publication Data
US 2022/0074264 A1    Mar. 10, 2022

(30) Foreign Application Priority Data
Sep. 4, 2020    (CN) .......................... 202010922680.8

(51) Int. Cl.
| | |
|---|---|
| *G06T 7/70* | (2017.01) |
| *B64U 10/14* | (2023.01) |
| *B64U 101/20* | (2023.01) |
| *B64U 101/26* | (2023.01) |
| *B64U 101/30* | (2023.01) |

(Continued)

(52) U.S. Cl.
CPC ................ *G06T 7/70* (2017.01); *B64U 10/14* (2023.01); *G01N 21/59* (2013.01); *B64U 2101/20* (2023.01); *B64U 2101/26* (2023.01); *B64U 2101/30* (2023.01); *B64U 2201/10* (2023.01);
(Continued)

(58) Field of Classification Search
CPC . G06T 7/70; G06T 2207/30232; G01N 21/59; B64U 2101/00; B64U 2101/20; B64U 2101/26; B64U 2101/30; B64U 2201/10; B64U 10/14; B64U 2201/00; E06B 2009/2464
See application file for complete search history.

(56) References Cited

U.S. PATENT DOCUMENTS 9,711,851 B1 *   7/2017  Cesarano ............. G05D 1/0094
10,139,837 B2 * 11/2018  Qin ........................ B64D 47/08
(Continued)

*Primary Examiner* — Aniss Chad
*Assistant Examiner* — Christopher George Fees
(74) *Attorney, Agent, or Firm* — Dority & Manning, P.A.

(57) ABSTRACT

A dimming device for a switchable glass includes a third wireless communications component and a third controller. The third wireless communications component is configured to establish a communications connection to a master computer and a second unmanned aerial vehicle, and to receive a target transmittance sent by the master computer and a transmittance of a switchable glass to be detected sent by the second unmanned aerial vehicle. The third controller is configured to adjust a voltage applied to the switchable glass to be detected when the transmittance of the switchable glass to be detected is inconsistent with the target transmittance, so that the transmittance of the switchable glass to be detected is consistent with the target transmittance.

16 Claims, 6 Drawing Sheets

(51) Int. Cl.
*E06B 9/24* (2006.01)
*G01N 21/59* (2006.01)

(52) U.S. Cl.
CPC ................. *E06B 2009/2464* (2013.01); *G06T 2207/30232* (2013.01)

(56) References Cited

U.S. PATENT DOCUMENTS

| | | | |
|---|---|---|---|
| 10,409,652 B2* | 9/2019 | Shrivastava | G02F 1/163 |
| 10,557,936 B2* | 2/2020 | Moskovchenko | B64D 47/00 |
| 11,683,450 B2* | 6/2023 | Lund | H04N 7/18 |
| | | | 348/144 |
| 2007/0268120 A1* | 11/2007 | Romig | B64C 1/1484 |
| | | | 340/469 |
| 2017/0227956 A1* | 8/2017 | Cesarano | H01Q 3/36 |
| 2017/0372625 A1* | 12/2017 | Horinouchi | B64C 39/024 |
| 2019/0234868 A1* | 8/2019 | Tanomura | G01N 21/3504 |
| 2021/0157336 A1* | 5/2021 | Kwak | B64F 1/20 |
| 2021/0263538 A1* | 8/2021 | Kwak | B64U 10/14 |

* cited by examiner

UNMANNED AERIAL VEHICLE AND DIMMING DEVICE FOR A SWITCHABLE GLASS

CROSS-REFERENCE TO RELATED APPLICATION

This application claims priority to Chinese Patent Application No. 202010922680.8, filed on Sep. 4, 2020, which is incorporated herein by reference in its entirety.

TECHNICAL FIELD

This application relates to the field of communications technologies, and in particular, to an unmanned aerial vehicle and a dimming device for a switchable glass.

BACKGROUND

A switchable glass or smart glass (also called smart switchable glass, smart window, or switchable window), is an innovative photoelectric glass which is composed of two outer layers of tempered glass and a smart film (often using either glass, acrylic or polycarbonate laminates) in the middle forming a sandwich-like structure. All these materials are tightly bonded through a special baking process.

When the power of the switchable glass is turned off, the liquid crystal molecules in the smart film are arranged disorderly, and light is then blocked by the smart film. That is, the switchable glass is an opaque. When the power of the switchable glass is turned on, liquid crystal molecules in the smart film are arranged orderly, and light can pass through the smart film. That is, the switchable glass is transparent when enabled. When enabled, the light transmittance of the switchable glass may be adjusted by adjusting the voltage applied to the switchable glass.

SUMMARY

In a first aspect, some embodiments of the present disclosure provide a first unmanned aerial vehicle. The first unmanned aerial vehicle includes: a emitting component disposed on a main body of the first unmanned aerial vehicle, a first wireless communications component and a first controller. The first wireless communications component is configured to establish a communications connection to a master computer, and receive a first planned route sent by the master computer. The first controller is configured to control the first unmanned aerial vehicle to fly to a first side of a switchable glass to be detected according to the first planned route; control the first unmanned aerial vehicle to fly to a same height as a detection point of the switchable glass to be detected; and control the emitting component to emit a detection light to the detection point.

In some embodiments, the emitting component includes three light-exit apertures, and the three light-exit apertures are configured to emit three parallel light rays.

In some embodiments, the first unmanned aerial vehicle further includes a permanent magnet disposed on the emitting component. The first controller is further configured to control the emitting component to move to the detection point before the emitting component is controlled to emit the detection light to the detection point.

In some embodiments, the first wireless communications component is further configured to establish a communications connection to a second unmanned aerial vehicle; and send first indication information to the second unmanned aerial vehicle after the emitting component moves to the detection point. The first indication information is used to indicate that the emitting component has been positioned to the detection point.

In some embodiments, the first unmanned aerial vehicle further includes a first camera configured to collect an image of the switchable glass to be detected. The first controller is configured to determine coordinates of the detection point of the switchable glass to be detected according to the image.

In some embodiments, the first unmanned aerial vehicle further includes a laser emitter configured to generate a laser signal after the first unmanned aerial vehicle flies to the same height as the detection point of the switchable glass to be detected.

In some embodiments, the first unmanned aerial vehicle further includes a transmission mechanism connecting the emitting component to the main body of the first unmanned aerial vehicle. The first controller being configured to control the emitting component to move to the detection point includes the first controller being configured to control the transmission mechanism to drive the emitting component to move to the detection point.

In some embodiments, the first side is an indoor side of the switchable glass.

In a second aspect, a second unmanned aerial vehicle is provided. The second unmanned aerial vehicle includes: a receiving component disposed on a main body of the second unmanned aerial vehicle, a second wireless communications component and a second controller. The second wireless communications component is configured to establish communications connections to a master computer and a dimming device, and receive a second planned route sent by the master computer. The second controller is configured to control the second unmanned aerial vehicle to fly to a second side of a switchable glass to be detected according to the second planned route; control the second unmanned aerial vehicle to fly to a same height as a detection point of the switchable glass to be detected; and obtain a transmittance of the switchable glass to be detected after determining that the receiving component receives a detection light. The second wireless communications component is further configured to send the transmittance of the switchable glass to be detected to the dimming device.

In some embodiments, the detection light includes three parallel light rays, and the receiving component includes three light-entrance apertures. The second controller being configured to obtain the transmittance of the switchable glass to be detected after determining that the receiving component receives the detection light includes the second controller being configured to obtain the transmittance of the switchable glass to be detected after determining that each of the three light-entrance apertures receives a corresponding light ray of the three parallel light rays.

In some embodiments, the second unmanned aerial vehicle further includes an electromagnetic coil disposed on the receiving component, and the electromagnetic coil generates a magnetic field after energized. The second controller is further configured to control the receiving component to move to the detection point of the switchable glass to be detected after the second unmanned aerial vehicle flies to the same height as the detection point; control a power supply of the second unmanned aerial vehicle to supply current to the electromagnetic coil after determining that each of the three light-entrance apertures receives the corresponding light ray of the three parallel light rays; and control the power supply to stop supplying current to the electromagnetic coil after obtaining the transmittance of the switchable glass to be detected.

In some embodiments, the second wireless communications component is further configured to establish a communications connection to the first unmanned aerial vehicle; and receive first indication information sent by the first unmanned aerial vehicle. The first indication information is used to indicate that the emitting component has been positioned to the detection point of the switchable glass to be detected. The second controller being configured to control the second unmanned aerial vehicle to fly to the same height as the detection point includes the second controller being configured to control the second unmanned aerial vehicle to fly to the same height as the detection point after the wireless communications component receives the first indication information.

In some embodiments, the second unmanned aerial vehicle further includes a second camera configured to collect an image of the first unmanned aerial vehicle. The second controller is further configured to determine a position of the first unmanned aerial vehicle according to the image of the first unmanned aerial vehicle.

In some embodiments, the second unmanned aerial vehicle further includes a laser receiver configured to receive a laser signal. The second controller being configured to control the second unmanned aerial vehicle to fly to the same height as the detection point includes the second controller being configured to control the second unmanned aerial vehicle to fly to a same height as the first unmanned aerial vehicle according to the detection point of the switchable glass to be detected; and adjust a position of the second unmanned aerial vehicle until the laser receiver receives the laser signal.

In some embodiments, the second side is an outdoor side of the switchable glass to be detected.

In a third aspect, a dimming device for a switchable glass is provided. The dimming device includes a third wireless communications component and a third controller. The third wireless communications component is configured to establish communications connections to the master computer and the second unmanned aerial vehicle; and receive a target transmittance sent by the master computer and a transmittance of switchable glass to be detected sent by the second unmanned aerial vehicle. The third controller is configured to adjust a voltage applied to the switchable glass to be detected when the transmittance of the switchable glass to be detected is inconsistent with the target transmittance, so that the transmittance of the switchable glass to be detected is consistent with the target transmittance.

In some embodiments, the third wireless communications component is further configured to send second indication information to the master computer after the transmittance of the switchable glass to be detected is adjusted to be consistent with the target transmittance. The second indication information is used to indicate that the switchable glass to be detected has been adjusted.

In some embodiments, the third wireless communications component is further configured to send third indication information to the master computer when the transmittance of the switchable glass to be detected is consistent with the target transmittance. The third indication information is used to indicate that the transmittance of the switchable glass to be detected is consistent with the target transmittance.

In some embodiments, the dimming device further includes a memory configured to store the target transmittance and a first voltage corresponding to the target transmittance. The first voltage is a voltage applied to the switchable glass to be detected when the transmittance of the switchable glass to be detected is adjusted to be the target transmittance.

In some embodiments, the memory is an electrically erasable programmable read-only memory.

BRIEF DESCRIPTION OF THE DRAWINGS

In order to describe technical solutions in embodiments of the present disclosure or the prior art more clearly, the accompanying drawings to be used in the description of embodiments or the prior art will be introduced briefly below. However, the accompanying drawings to be described below are merely some embodiments of the present disclosure, and a person of ordinary skill in the art can obtain other drawings according to those drawings without paying any creative effort.

DETAILED DESCRIPTION

In order to make objectives, technical solutions, and advantages of the present disclosure more clear, the present disclosure is further described in detail below with reference to specific embodiments and with reference to the accompanying drawings.

Unless otherwise defined, technical terms or scientific terms used in one embodiment or some embodiments of the present disclosure shall be understood as ordinary meanings by a person of ordinary skill in the field that the present disclosure belongs to. Terms "first", "second" and the like used in one embodiment or some embodiments of the present disclosure are not intended to mean any order, quantity or importance, and are merely used to distinguish different components. Terms "include" or "comprise" mean that an element or item appearing before the word covers the element(s) or item(s) appearing after the word and the equivalent thereof without excluding other elements or items. Terms "connect", "couple" or a similar word thereof are not limited to physical or mechanical connections, but may include electrical connections, whether direct or indirect. Terms "upper", "lower", "left", "right" and the like are only used to indicate a relative positional relationship, and when the absolute position of the described object is changed, the relative positional relationship may also be changed accordingly.

A switchable glass is often used to constitute a window of a building, a vehicle or an airplane. In actual use, multiple pieces of switchable glasses are often assembled to form a window. After assembly, since the positions of the switchable glasses are different, wires used to supply voltage to the switchable glasses are different in length, which may cause inconsistent transmittance of the switchable glasses. In addition, difference in installation environment of the switchable glasses may also lead to inconsistent transmittance. Inconsistency of transmittance of the switchable glasses affects the light transmittance of the window constituted by the switchable glasses. To solve the problem of inconsistent transmittance, it is often necessary to measure (detect) the transmittance of the switchable glass first. However, current measurement method is a manual measurement which requires workers to climb to the building. Therefore, the measurement of the transmittance of the switchable glass is time-consuming and labor-consuming.

It should be noted that, transmittance herein refers to the percentage of radiation that can pass through a switchable glass. Transmittance can be defined for different types of light or energy, e.g., visible transmittance, ultraviolet (UV) transmittance, or infrared transmittance.

Figure 1:
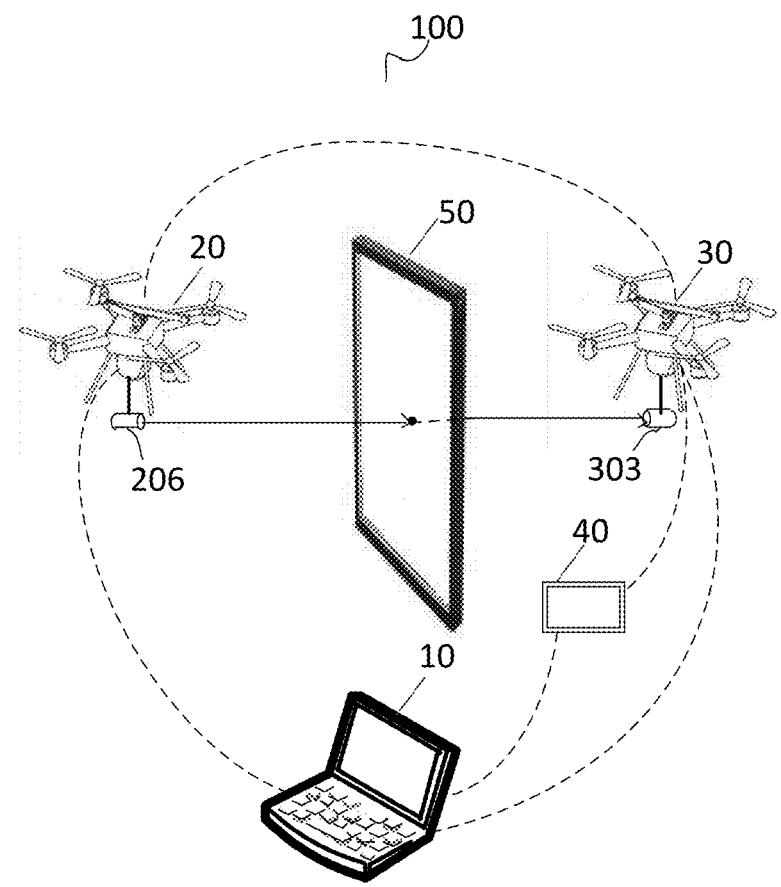
FIG. 1 is a schematic diagram of a dimming system for a switchable glass, in accordance with some embodiments.

Some embodiments of the present disclosure provide a dimming system for a switchable glass. As shown in FIG. 1, the dimming system 100 includes a master computer 10, a first unmanned aerial vehicle 20, a second unmanned aerial vehicle 30 and a dimming device 40. Wireless communications connections are established between the first unmanned aerial vehicle 20 and the master computer 10, between the second unmanned aerial vehicle 30 and the master computer 10, and between the dimming device 40 and the master computer 10. Further, a wireless communication connection is established between the second unmanned aerial vehicle 30 and the dimming device 40. Optionally, a wireless communication connection (not shown in FIG. 1) may also be established between the first unmanned aerial vehicle 20 and the dimming device 40.

The master computer 10 is configured to generate a first planned route for controlling the flight of the first unmanned aerial vehicle 20 and a second planned route for controlling the flight of the second unmanned aerial vehicle 30, and send the first planned route and the second planned route to the first unmanned aerial vehicle 20 and the second unmanned aerial vehicle 30, respectively. For example, the master computer 10 may communicate to the first unmanned aerial vehicle 20 and the second unmanned aerial vehicle 30 through the established communication connections with the first unmanned aerial vehicle 20 and the second unmanned aerial vehicle 30.

The master computer 10, also called the host computer 10 or the upper computer 10, refers to a computer that is able to directly issue control commands. For example, the master computer 10 may be a personal computer (PC).

The first unmanned aerial vehicle 20 is configured to fly to a first side of the switchable glass 50 to be detected according to the first planned route, and control the emitting component 206 of the first unmanned aerial vehicle 20 to emit a detection light to a detection point after the first unmanned aerial vehicle 20 flies to a same height as the detection point of the switchable glass 50 to be detected.

The second unmanned aerial vehicle 30 is configured to fly to a second side (i.e., the other side) of the switchable glass 50 according to the second planned route, and control the receiving component 303 of the second unmanned aerial vehicle 30 to receive the detection light emit by the emitting component 206 after the second unmanned aerial vehicle 30 flies to the same height as the detection point. The second unmanned aerial vehicle 30 is further configured to obtain the transmittance of the switchable glass 50 to be detected after the receiving component 303 receives the detection light, and to send the transmittance of the switchable glass 50 to be detected to the dimming device 40.

In the embodiments of the present disclosure, the first unmanned aerial vehicle 20 and the second unmanned aerial vehicle 30 are located on two opposite sides of the switchable glass 50 to be detected. For example, the first unmanned aerial vehicle 20 may be located on an indoor side of the switchable glass (i.e., the first unmanned aerial vehicle 20 is located indoors), the second unmanned aerial vehicle 30 may be located on an outdoor side of the switchable glass (i.e., the second unmanned aerial vehicle 30 is located outdoors). In this case, the detection light emitted by the emitting component 206 is emitted from the interior to the exterior, which may avoid a situation where the detection light emitted by the emitting component 206 is interfered by the light outdoors, and further ensure detection reliability. Of course, if necessary, the second unmanned aerial vehicle 30 may be located indoors, and the first unmanned aerial vehicle 20 may be located outdoors.

In the dimming system 100 for switchable glass provided by the embodiments of the present disclosure, the first unmanned aerial vehicle 20 controls the emitting component 206 to emit a detection light, and the second unmanned aerial vehicle 30 controls the receiving component 303 to receive the detection light and obtain a transmittance of the switchable glass to be detected. The transmittance of the switchable glass 50 to be detected is measured. The measured transmittance is sent to the dimming device 40, and the dimming device 40 adjusts the transmittance of the switchable glass 50 according to the measured transmittance of the switchable glass 50 to be detected, so that the transmittance of the switchable glass 50 to be detected is consistent with other switchable glasses. In addition, the transmittance is automatically detected and adjusted by using the unmanned aerial vehicles, which improves the adjustment of the transmittance of the switchable glass.

In the following embodiments, the first unmanned aerial vehicle 20, the second unmanned aerial vehicle 30 and the dimming device 40 in the dimming system 100 will be introduced.

Figure 2:
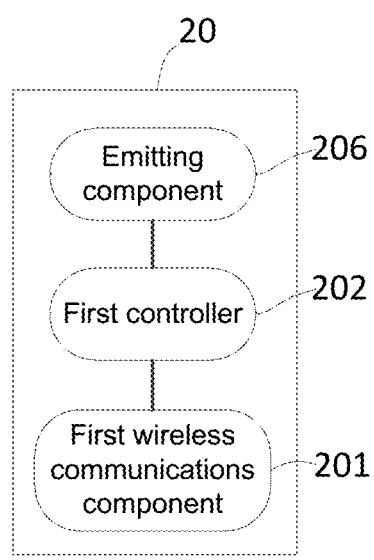
FIG. 2 is a block diagram of a first unmanned aerial vehicle, in accordance with some embodiments.

FIG. 2 is a block diagram of a first unmanned aerial vehicle provided by some embodiments of the present disclosure. As shown in FIG. 2, the first unmanned aerial vehicle 20 includes an emitting component 206 disposed on the main body of the first unmanned aerial vehicle 20, a first wireless communications component 201 and a first controller 202.

For example, the first wireless communications component 201 may include a 4-th generation (4G™) module, a 5-th generation (5G™) module, a BLUETOOTH® module, or a WI-FI™ is a widely used technology for local area networking of radio wireless devices based on the IEEE 802.11 standards. BLUETOOTH is a widely used technology for short-range wireless communications of radio wireless devices. The first controller 202, also called a flight controller, may be a central processing unit (CPU), or may be a general-purpose processor, a digital signal processor (DSP), an application-specific integrated circuit (ASIC), a field programmable gate array (FPGA), or any other programmable logic device, a discrete gate or a transistor logic device, a discrete hardware component, etc.

The first wireless communications component 201 is configured to establish a communications connection to the master computer 10 and receive the first planned route sent by the master computer 10.

The first controller 202 is configured to control the first unmanned aerial vehicle 20 to fly to a first side of the switchable glass 50 to be detected according to the first planned route, control the first unmanned aerial vehicle 20 to fly to a same height as the detection point of the switchable glass 50 to be detected, and control the emitting component 206 to emit the detection light to the detection point.

The emitting component 206 may be an infrared emitting component or an ultraviolet emitting component, that is, the detection light emitted by the emitting component 206 may be an infrared ray or an ultraviolet ray.

It will be noted that, in the embodiments of the present disclosure, if the first unmanned aerial vehicle 20 is at the same height as the detection point of the switchable glass 50 to be detected, it means that the emitting component 206 of the first unmanned aerial vehicle 20 is at a same height as the detection point. In this way, the detection light emitted by the emitting component 206 can be vertically irradiated to the detection point of the switchable glass 50 to be detected, so that the receiving component 303 of the second unmanned aerial vehicle 30 can receive a certain amount of the detection light.

In an example, the detection point of the switchable glass 50 to be detected may be any point of the switchable glass 50 to be detected. For example, once the first unmanned aerial vehicle 20 is located within an area corresponding to coordinates of the switchable glass 50 to be detected, a point of the switchable glass 50 to be detected where the first unmanned aerial vehicle 20 is pointing to may be taken as the detection point.

In another example, the detection point of the switchable glass 50 to be detected may be a preset position of the switchable glass 50 to be detected. For example, the detection point may be a center point of the switchable glass 50 to be detected, or a vertex of the switchable glass 50 to be detected. Optionally, the master computer 10 may calculate and save the coordinates of the detection point in advance, and then send the coordinates to the first unmanned aerial vehicle 20 and/or the second unmanned aerial vehicle 30 during detection process. Alternatively, the first unmanned aerial vehicle 20 may collect an image of the switchable glass 50 to be detected, and calculate the coordinates of the detection point according to the collected image.

Figure 3:
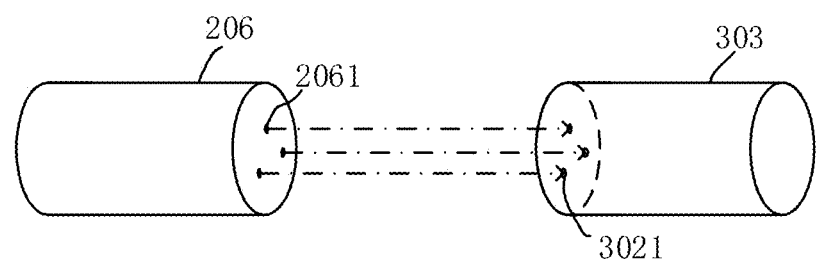
FIG. 3 is a schematic diagram showing an emitting component of the first unmanned aerial vehicle and a receiving component of the second unmanned aerial vehicle, in accordance with some embodiments.

In some embodiments, as shown in FIG. 3, the emitting component 206 may include three light-exit apertures 2061, and the three light-exit apertures 2061 are configured to emit three parallel light rays.

In this case, as shown in FIG. 3, the receiving component 303 of the second unmanned aerial vehicle may include three light-entrance apertures 3021, and positions of the three light-entrance apertures 3021 are in a one-to-one correspondence with the positions of the three light-exit apertures 2061. On this basis, when each of the three light-entrance apertures 3021 of the receiving component 303 are aligned with a respective light-exit aperture 2061, each light-entrance apertures 3021 can receive a light ray emitted from a corresponding light-exit aperture 2061. That is to say, during measurement of the light transmittance of the switchable glass, if each of the three light-entrance apertures 3021 of the receiving component 303 receives a light ray, it indicates that the receiving component 303 has been aligned with the emitting component 206. Therefore, if the transmittance of the switchable glass is obtained after determining that the three light-entrance apertures 3021 all receive the detection lights, the detection accuracy may be improved.

It should be noted that, the positions of the three light-exit apertures 2061 are not limited in the embodiments of the present disclosure. For example, as shown in FIG. 3, the three light-exit apertures 2061 have a triangular arrangement. In another example, the three light-exit apertures 2061 are arranged in a line. In some other examples, the three light-exit apertures 2061 may have other suitable arrangements.

Figure 4:
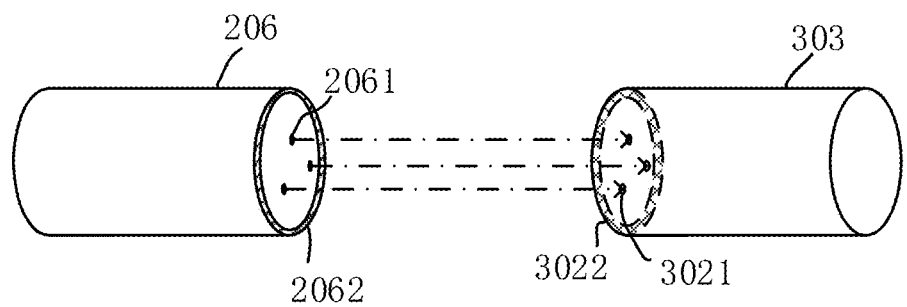
FIG. 4 is a schematic diagram showing an emitting component of the first unmanned aerial vehicle and a receiving component of the second unmanned aerial vehicle, in accordance with some embodiments.

In some embodiments, as shown in FIG. 4, the first unmanned aerial vehicle further includes a permanent magnet 2062 disposed on the emitting component 206 and an electromagnetic coil 3022 disposed on the receiving component 303. After the electromagnetic coil 3022 is energized, it generates a magnetic field that attracts the permanent magnet 2062 disposed on the emitting component 206. After the electromagnetic coil 3022 is de-energized, the magnetic field disappears accordingly.

For example, as shown in FIG. 4, the permanent magnet 2062 may be disposed on a side of the emitting component 206 close to the switchable glass 50 to be detected. The electromagnetic coil 3022 may be disposed on a side of the receiving component 303 close to the switchable glass 50 to be detected. For example, the permanent magnet 2062 may be disposed on an entire or a portion of the surface the emitting component 206 close to the switchable glass 50 to be detected, and the electromagnetic coil 3022 may be disposed on an entire or a portion of the surface of the receiving component 303 close to the switchable glass 50 to be detected.

The first controller 202 is further configured to control the transmitting component 301 to move to the detection point before the emitting component 206 is controlled to emit the detection light to the detection point.

On the other side of the switchable glass 50 to be detected, after the second unmanned aerial vehicle 30 controls the receiving component 303 to move to the detection point and all the three light-entrance apertures 3021 have received light rays simultaneously, the second unmanned aerial vehicle 30 controls a power supply of the second unmanned aerial vehicle 30 to supply current to the electromagnetic coil 3022, so that the electromagnetic coil 3022 is energized to generate a magnetic field. The magnetic field attracts the permanent magnet 2062 disposed on the emitting component 206, and the receiving component 303 and the emitting component 206 are then attracted together firmly. In this way, the receiving component 303 can be continuously aligned with the emitting component 206 during the measurement of the transmittance, which may avoid a situation where the receiving component 303 is misaligned with the emitting component 206, thereby ensuring the detection accuracy.

Figure 5:
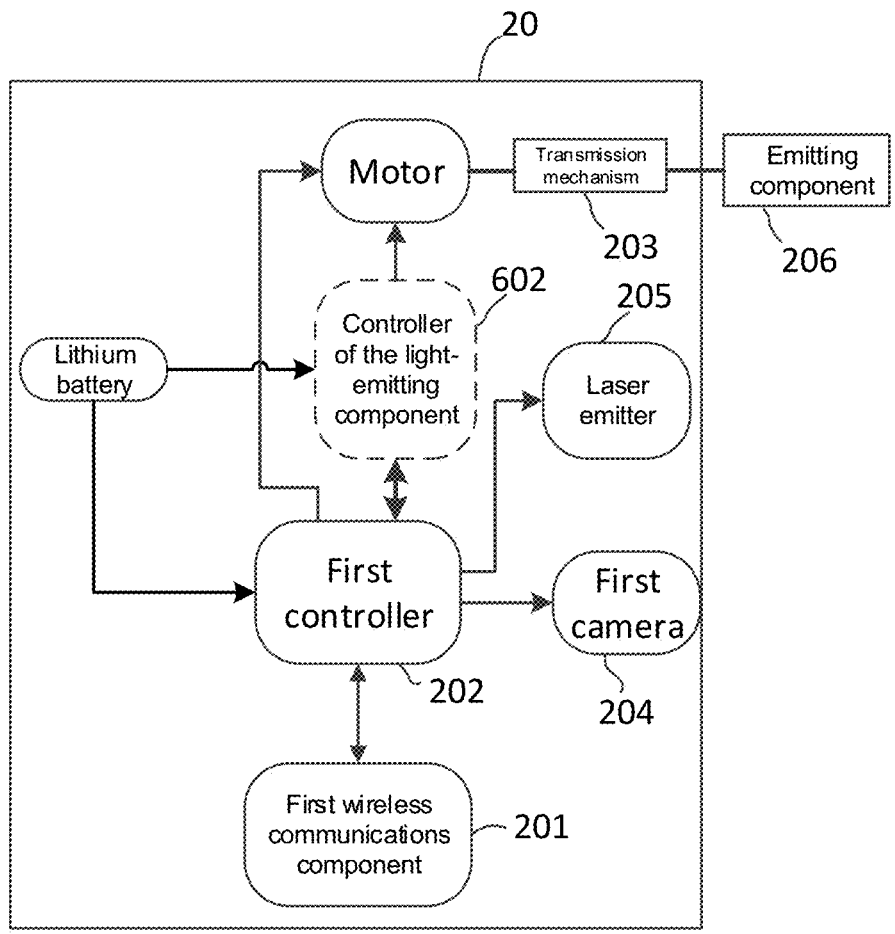
FIG. 5 is a block diagram of another first unmanned aerial vehicle, in accordance with some embodiments.

In some embodiments, as shown in FIG. 5, the first unmanned aerial vehicle 20 may further include a transmission mechanism 203 connecting the emitting component 206 to the main body of the first unmanned aerial vehicle 20.

In this case, the first controller 202 being configured to control the emitting component 206 to move to the detection point includes the first controller 202 being configured to control the transmission mechanism 203 to drive the emitting component 206 to move to the detection point.

The transmission mechanism 203 may be a gear transmission mechanism, a worm gear transmission mechanism, a screw transmission mechanism composed of screws and nuts, and the like. The first controller 202 can control a motor to drive the transmission mechanism 203, and then drive the emitting component 206 to move to the detection point.

In some embodiments, the first wireless communications component 201 is further configured to establish a communications connection to the second unmanned aerial vehicle 30, and send first indication information to the second unmanned aerial vehicle 30 after the emitting component 206 moves to the detection point. The first indication information is used to indicate that the emitting component 206 has been positioned to the detection point.

On this basis, when receiving the first indication information, the second unmanned aerial vehicle 30 determines that the emitting component 206 has been positioned to the detection point of the switchable glass 50 to be detected, and then flies to the same height as the first unmanned aerial vehicle 20 to measure the transmittance of the switchable glass 50 to be detected.

In some embodiments, as shown in FIG. 5, the first unmanned aerial vehicle 20 further includes a first camera 204 configured to collect an image of the switchable glass 50 to be detected.

The first controller 202 is further configured to determine the coordinates of the detection point according to the image of the switchable glass 50 to be detected before the first unmanned aerial vehicle 20 is controlled to fly to the same height as the detection point.

Figure 6:
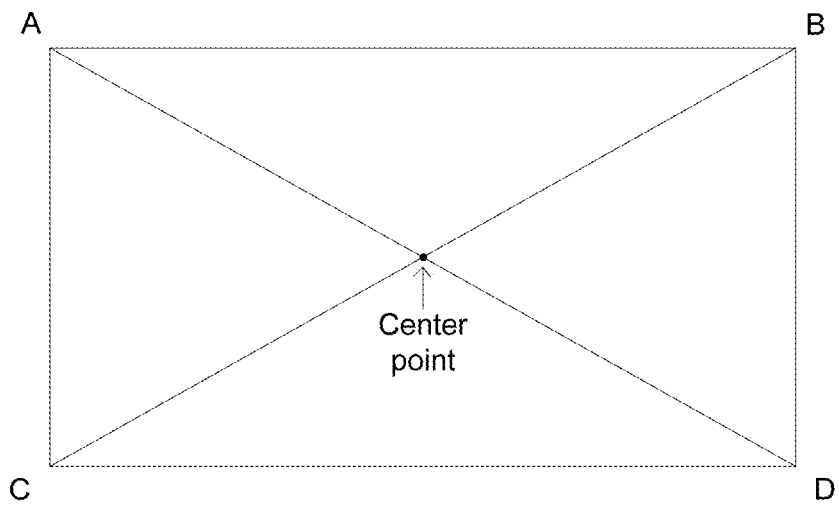
FIG. 6 is a schematic diagram of showing a center point of an image, in accordance with some embodiments.

For example, if the center point of the switchable glass 50 to be detected is taken as the detection point, the first controller may determine coordinates of the center point of the image according to the image corresponding to the switchable glass 50 to be detected, take the coordinates of the center point as the coordinates of the detection point. Referring to FIG. 6, a way of calculating the coordinate of the center point of the image may be calculating an average value of the coordinates of four vertices A, B, C, and D of the image. The average value of the abscissas of the four vertices is the abscissa of the center point of the image, and the average value of the ordinates of the four vertices is the ordinate of the center point of the image. Alternatively, another way of calculating the coordinate of the center point of the image may include determining straight line equations of the two diagonal lines AC and BD firstly, and determining the coordinates of the intersection point of two straight line equations. The coordinates of the intersection point is the coordinates of the center point of the image. Of course, there may be other methods to calculate the coordinate of the center point of the image, which is not limited in the embodiments of the present disclosure.

In some embodiments, as shown in FIG. 5, the first unmanned aerial vehicle 20 may further include a laser emitter 205 configured to generate a laser signal after the first unmanned aerial vehicle 20 flies to the same height as the detection point of the switchable glass 50 to be detected.

In this case, a corresponding laser receiver may be disposed on the second unmanned aerial vehicle 30, so that the second unmanned aerial vehicle 30 can find the first unmanned aerial vehicle 20 according to the laser signal emitted by the laser emitter 205 on the first unmanned aerial vehicle 20, and control the receiving component 303 to be aligned with the emitting component 206.

Optionally, as shown in FIG. 5, the first unmanned aerial vehicle 20 may further have a controller of the emitting component 602 electrically connected to the first controller 202. In this case, the first controller 202 may control the emitting component 206 through the controller of the emitting component 602.

In some embodiments, as shown in FIG. 5, the first unmanned aerial vehicle 20 may further include a lithium battery used to supply power to the first controller 202 and the controller of the emitting component 602.

Figure 7:
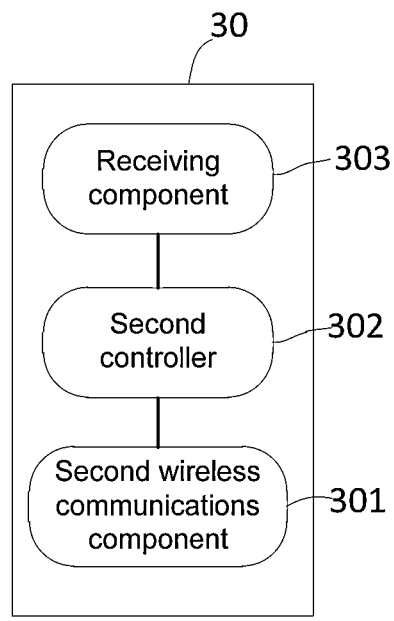
FIG. 7 is a block diagram of a second unmanned aerial vehicle, in accordance with some embodiments.

FIG. 7 is a block diagram of the second unmanned aerial vehicle 30 provided by some embodiments of the present disclosure. As shown in FIG. 7, the second unmanned aerial vehicle 30 includes a receiving component 303 disposed on a main body of the second unmanned aerial vehicle 30, a second wireless communications component 301 and a second controller 302.

For example, the second wireless communications component 301 may include a 4G™ module, a 5G™ module, a BLUETOOTH® module, or a WI-FI™ module. The second controller 302 may be a central processing unit (CPU), a general-purpose processor, a digital signal processor (DSP), an application-specific integrated circuit (ASIC), a field programmable gate array (FPGA), any other programmable logic device, a discrete gate or transistor logic device, or a discrete hardware component.

The second wireless communications component 301 is configured to establish communications connections to the master computer 10 and the dimming device 40, and receive the second planned route sent by the master computer 10.

The second controller 302 is configured to control the second unmanned aerial vehicle 30 to fly to the second side (i.e., the side opposite to the first side) of the switchable glass 50 to be detected according to the second planned route, control the second unmanned aerial vehicle 30 to fly to the same height as the detection point, and obtain the transmittance of the switchable glass 50 to be detected after determining that the receiving component 303 receives the detection light emit by the emitting component 206.

For example, according to the luminous flux of the detection light received by the receiving component 303 and the luminous flux of the detection light emitted by the emitting component 206, the second controller 302 may determine the transmittance of the switchable glass 50 to be detected.

The second wireless communications component 301 is further configured to send the transmittance of the switchable glass 50 to be detected to the dimming device 40.

It will be noted that, in the embodiments of the present disclosure, if the second unmanned aerial vehicle 30 and the detection point are at the same height, it means that the receiving component 303 of the second unmanned aerial vehicle 30 and the detection point are at the same height.

In some embodiments, as shown in FIG. 3, the receiving component 303 may include three light-entrance apertures 3021, and each receiving hole 3021 corresponds to one of the three transmitting holes 2061 of the emitting component 206. The detection light includes three parallel light rays.

In this case, the second controller 302 being configured to obtain the transmittance of the switchable glass 50 to be detected after determining that the receiving component 303 receives the detection light includes the second controller 302 being configured to obtain the transmittance of the switchable glass 50 to be detected after determining that each of the three light-entrance apertures 3021 receives a corresponding light ray of the three parallel light rays.

Based on the above embodiment, when each of the three light-entrance apertures 3021 of the receiving component 303 receives a light ray emitted from a corresponding light-exit aperture 2061, it indicates that the receiving component 303 is aligned with the emitting component 206. Therefore, if the transmittance of the switchable glass is obtained after determining that the three light-entrance apertures 3021 all receive the detection lights, the detection accuracy may be improved.

In some embodiments, as shown in FIG. 4, the second unmanned aerial vehicle 30 further includes an electromagnetic coil 3022 disposed on the receiving component 303. The electromagnetic coil 3022 can generate a magnetic field that attracts the permanent magnet 2062 disposed on the emitting component 206 after energized. After the electromagnetic coil 3022 is de-energized, the magnetic field disappears accordingly.

The second controller 302 is further configured to control the receiving component 303 to move to the detection point of the switchable glass 50 to be detected after the second unmanned aerial vehicle 30 flies to the same height as the first unmanned aerial vehicle 20, to control the power supply of the second unmanned aerial vehicle 30 to supply current to the electromagnetic coil 3022 after determining that each of the three light-entrance apertures 3021 receives the corresponding light ray of the three parallel light rays, and to control the power supply to stop supplying current to the switch of the electromagnetic coil 3022 after obtaining the transmittance of the switchable glass 50 to be detected.

Based on the above embodiment, after the receiving component 303 moves horizontally to the detection point and all the three light-entrance apertures 3021 have received light rays simultaneously, the power supply current to the electromagnetic coil 3022 to generate the magnetic field. The magnetic field attracts the permanent magnet 2062 disposed on the emitting component 206, and the receiving component 303 and the emitting component 206 are then attracted together firmly. In this way, the receiving component 303 can be continuously aligned with the emitting component 206 during the measurement of the transmittance, which may avoid a situation where the receiving component 303 is misaligned with the emitting component 206, thereby ensuring the detection accuracy.

Figure 8:
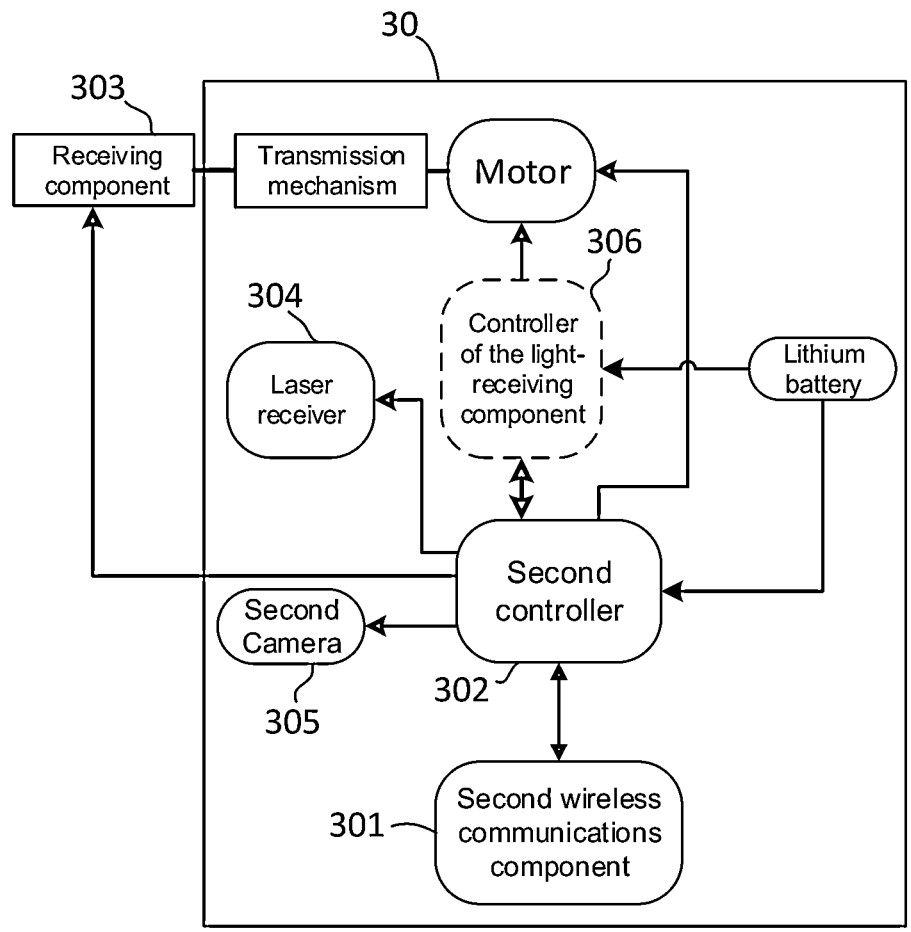
FIG. 8 is a block diagram of another second unmanned aerial vehicle, in accordance with some embodiments.

In some embodiments, as shown in FIG. 8, the receiving component 303 may be connected to the main body of the second unmanned aerial vehicle 30 through a transmission mechanism. The second controller 302 may control a motor to drive the transmission mechanism, and then drive the receiving component 303 to move to the detection point.

For example, the transmission mechanism may be a gear transmission mechanism, a worm gear transmission mechanism, a screw transmission mechanism composed of screws and nuts, and the like.

In some embodiments, the second wireless communications component 301 is further configured to establish a communications connection to the first unmanned aerial vehicle 20, and receive the first indication information sent by the first unmanned aerial vehicle 20. The first indication information is used to indicate that the emitting component 206 has been positioned to the detection point of the switchable glass 50 to be detected.

The second controller 302 being configured to control the second unmanned aerial vehicle 30 to fly to the same height as the detection point includes the second controller 302 being configured to control the second unmanned aerial vehicle 30 to fly to the same height as the detection point after the second wireless communications component 301 receives the first indication information.

In this case, when receiving the first indication information, the second unmanned aerial vehicle 30 determines that the emitting component 206 has been positioned to the detection point of the switchable glass 50 to be detected, and then flies to the same height as the detection point to measure the transmittance of the switchable glass 50 to be detected.

In some embodiments, as shown in FIG. 8, the second unmanned aerial vehicle 30 may further include a second camera 305 configured to collect an image of the first unmanned aerial vehicle 20.

The second controller 302 is further configured to determine the position of the first unmanned aerial vehicle 20 according to the image of the first unmanned aerial vehicle 20.

The second controller 302 may determine the position of the first unmanned aerial vehicle 20 using an existing target recognition algorithm, which is not described in the embodiments of the present disclosure.

In some other embodiments, the second unmanned aerial vehicle 30 can also obtain the position information of the first unmanned aerial vehicle 20 through the communications connection to the first unmanned aerial vehicle 20. For example, the first unmanned aerial vehicle 20 can send the position information of the first unmanned aerial vehicle 20 to the second unmanned aerial vehicle 30 after the emitting component 206 is positioned to the detection point of the switchable glass 50 to be detected.

In some embodiments, as shown in FIG. 8, the second unmanned aerial vehicle 30 may further include a laser receiver 304 configured to receive a laser signal.

The second controller 302 being configured to control the second unmanned aerial vehicle 30 to fly to the same height as the detection point includes: the second controller 302 being configured to: control the second unmanned aerial vehicle 302 to fly to the same height as the first unmanned aerial vehicle 20 according to the position of the first unmanned aerial vehicle 20; and adjust the position of the second unmanned aerial vehicle 30 until the laser receiver 304 receives the laser signal.

Based on the above embodiment, the second unmanned aerial vehicle 30 can find the first unmanned aerial vehicle 20 according to the laser signal sent by the laser emitter 205 of the first unmanned aerial vehicle 20, and align the receiving component 303 with the emitting component 206.

Optionally, as shown in FIG. 8, the second unmanned aerial vehicle 30 may further include a controller of the receiving component 306 electrically connected to the second controller 302. In this case, the second controller 302 can control the receiving component 303 through the controller of the receiving component 306. The controller of the receiving component 306 can calculate the transmittance of the switchable glass 50 to be detected, and send the transmittance to the second controller 302.

In some embodiments, as shown in FIG. 8, the second unmanned aerial vehicle 30 may further include a lithium battery used to supply power to the second controller 302 and the controller of the receiving component 306.

Figure 9:
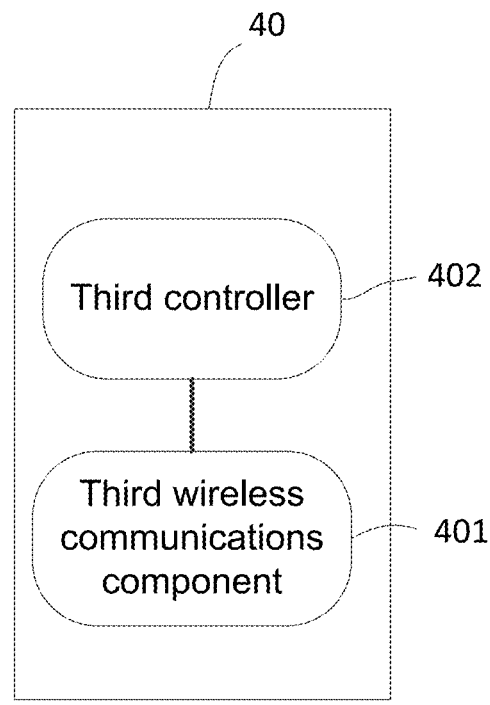
FIG. 9 is a schematic diagram of a dimming device for a switchable glass, in accordance with some embodiments.

FIG. 9 is a block diagram of a dimming device for a switchable glass provided by some embodiments of the present disclosure. As shown in FIG. 9, the dimming device 40 includes a third wireless communications component 401 and a third controller 402.

For example, the third wireless communications component 401 may include a 4G™ module, a 5G™ module, a BLUETOOTH® module, a WI-FI™ module, and so on. The third controller 402 may be a central processing unit (CPU), or a general-purpose processor, a digital signal processor (DSP), an application-specific integrated circuit (ASIC), a field programmable gate array (FPGA), or any other programmable logic device, a discrete gate or transistor logic device, a discrete hardware component, etc The third wireless communications component 401 is configured to establish communications connections to the master computer 10 and to the second unmanned aerial vehicle 30, and receive a target transmittance sent by the master computer 10 and the transmittance of the switchable glass 50 to be detected sent by the second unmanned aerial vehicle 30.

The third controller 402 is configured to adjust the voltage applied to the switchable glass 50 to be detected when the transmittance of the switchable glass 50 to be detected is inconsistent with the target transmittance, so that the transmittance of the switchable glass 50 to be detected is consistent with the target transmittance.

In some examples, according to the difference between the transmittance of the switchable glass 50 to be detected and the target transmittance, and a correspondence relationship between the voltage applied to the switchable glass and variation of the transmittance of the switchable glass, the voltage required to make the switchable glass 50 to be detected reach the target transmittance may be calculated. According to the calculated voltage, voltage applied to the switchable glass 50 to be detected is adjusted, so as to make the switchable glass 50 to be detected reach the target transmittance. The correspondence relationship between the voltage applied to the switchable glass and variation of the transmittance of the switchable glass may be obtained in advance through multiple experiments.

In some other examples, the voltage applied to the switchable glass 50 to be detected may be adjusted according to a preset voltage variation. After adjustment, the dimming device 40 may send indication information to the first unmanned aerial vehicle 20 and the second unmanned aerial vehicle 30, so as to instruct the first unmanned aerial vehicle 20 and the second unmanned aerial vehicle 30 to measure transmittance of the switchable glass 50 to be detected again. After multiple detections and adjustments, the transmittance of the switchable glass 50 to be detected can be adjusted to the target transmittance.

In some embodiments, the third wireless communications component 401 is further configured to send second indication information to the master computer 10 when the transmittance of the switchable glass 50 to be detected is adjusted to be consistent with the target transmittance. The second indication information is used to indicate that the switchable glass 50 to be detected has been adjusted.

In this way, after receiving the second indication information, the master computer 10 can determine that the switchable glass 50 to be detected has been adjusted, and then determines to measure and adjust transmittance of other switchable glasses that have not yet been detected.

In some embodiments, the third wireless communications component 401 is further configured to send third indication information to the master computer 10 when the transmittance of the switchable glass 50 to be detected is consistent with the target transmittance. The third indication information is used to indicate that the transmittance of the switchable glass 50 to be detected is consistent with the target transmittance.

In this way, after receiving the third indication information, the master computer 10 can determine that there is no need to adjust the current switchable glass 50, and then determines to measure and adjust transmittance of other switchable glasses that have not yet been detected.

Figure 10:
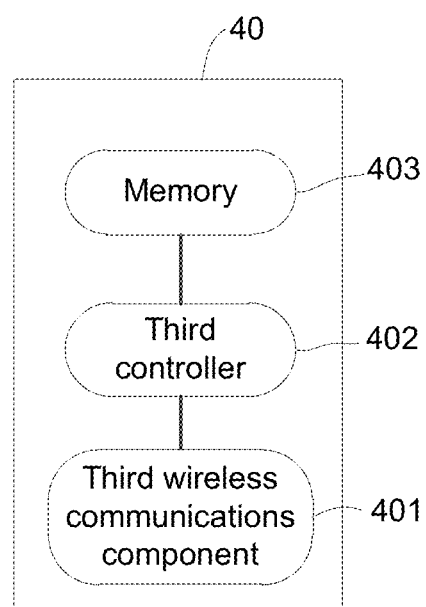
FIG. 10 is a schematic diagram of another dimming device for a switchable glass, in accordance with some embodiments.

In some embodiments, as shown in FIG. 10, the dimming device 40 further includes a memory 403. The memory 403 is configured to store the target transmittance and a first voltage corresponding to the target transmittance. The first voltage corresponding to the target transmittance is a voltage applied to the switchable glass 50 to be detected when the transmittance of the switchable glass 50 to be detected is adjusted to be the target transmittance.

For example, the memory 403 may be an electrically erasable programmable read-only memory 403 (EEPROM). Of course, the memory 403 may also be other memories, such as a random access memory 403 (RAM), a magnetic disk, or an optical disk.

Based on the above embodiment, if the transmittance of the switchable glass 50 to be detected needs to be adjusted to the target transmittance again, the voltage applied to the switchable glass 50 to be detected may be directly adjusted to the stored first voltage, so that the switchable glass 50 reaches the target transmittance. In this way, there is no need to perform the measurement of the transmittance of the switchable glass again.

Figure 11:
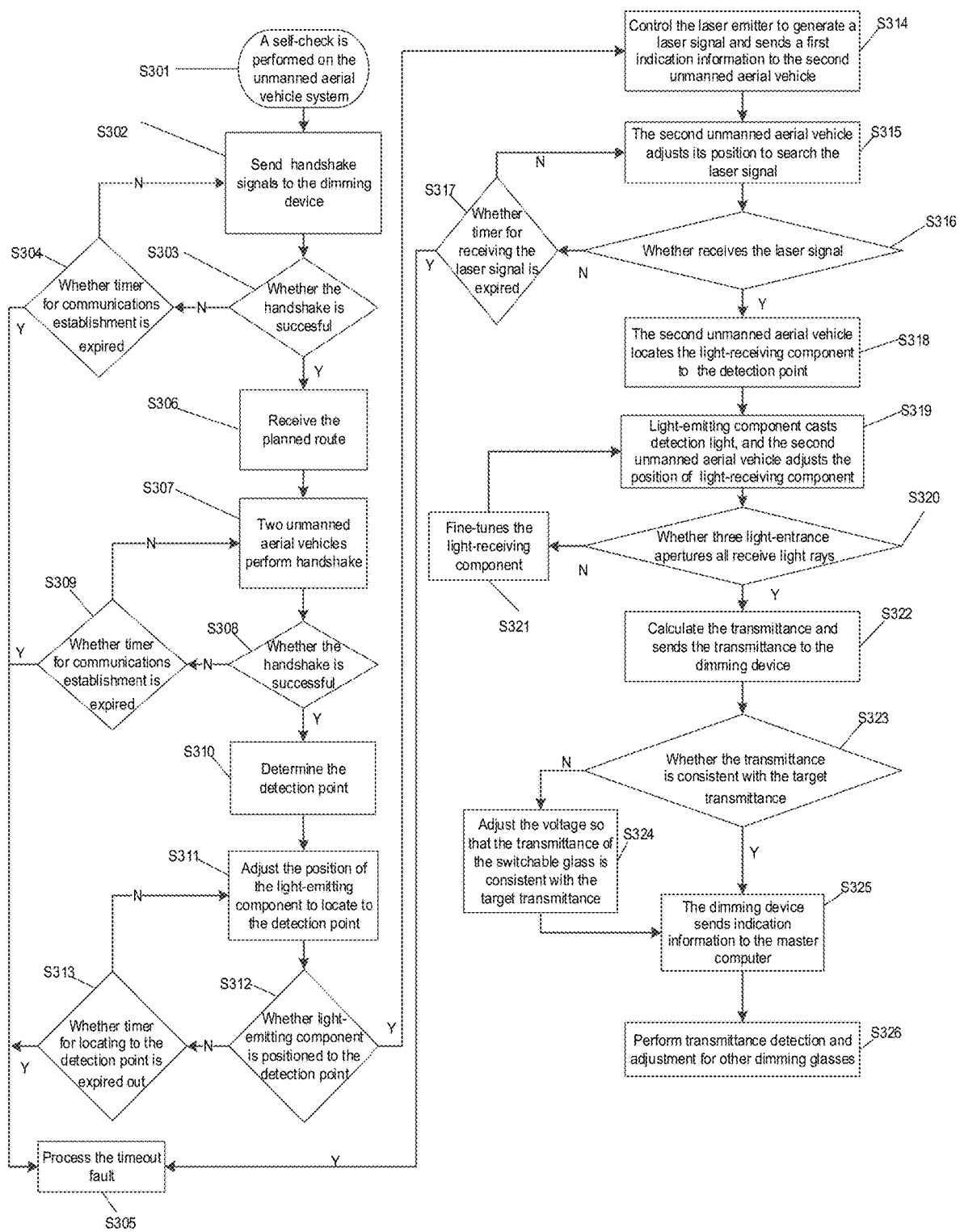
FIG. 11 is a flow diagram of a method for dimming a switchable glass, in accordance with some embodiments.

As shown in FIG. 11, some embodiments of the present disclosure further provide a dimming method applied to the dimming system 100 as shown in FIG. 1. Referring to FIG. 11, the method includes S301 to S326.

In S301, a self-check is performed on the unmanned aerial vehicle system after powered.

The unmanned aerial vehicle system includes the first unmanned aerial vehicle 20, the second unmanned aerial vehicle 30 and the master computer 10. After the self-check is completed, S302 is performed.

In S302, the first unmanned aerial vehicle 20 and the second unmanned aerial vehicle 30 send handshake signals to the dimming device 40 to establish communications connections to the dimming device 40.

In S303, it is determined whether the handshake with the dimming device 40 is successful; if yes, S306 is performed; if no, S304 is performed.

In S304, if the handshake with the dimming device 40 is unsuccessful, it is determined whether a timer for communications establishment is expired or not; if yes, S305 is performed; if no, S302 is performed, and the first unmanned aerial vehicle 20 and the second unmanned aerial vehicle 30 resend the handshake signal.

In S305, a timeout fault is processed.

After the timeout fault is processed, the handshake signals are resent.

In S306, the first unmanned aerial vehicle 20 receives the first planned route sent by the master computer 10 and flies to a side (e.g., indoor side) of the switchable glass 50 to be detected, and the second unmanned aerial vehicle 30 receives the second planned route sent by the master computer 10 and flies to the other side (e.g., outdoor side) of the switchable glass 50 to be detected.

In S307, the first unmanned aerial vehicle 20 and the second unmanned aerial vehicle 30 perform handshake to establish a communications connection.

In this step, the first unmanned aerial vehicle 20 may send a handshake signal to the second unmanned aerial vehicle 30, or the second unmanned aerial vehicle 30 may send a handshake signal to the first unmanned aerial vehicle 20.

In S308, it is determined whether the handshake between the first unmanned aerial vehicle 20 and the second unmanned aerial vehicle 30 is successful; if yes, S310 is performed; otherwise, S309 is performed.

In S309, if the handshake is unsuccessful, it is further determined whether the timer for communications establishment is expired or not; if yes, S305 is performed; if no, S307 is performed, and the first unmanned aerial vehicle 20 and the second unmanned aerial vehicle 30 perform handshake.

After the timeout fault is processed, the process may return to S307, so that the first unmanned aerial vehicle 20 and the second unmanned aerial vehicle 30 perform handshake again.

In S310, the first unmanned aerial vehicle 20 determines the detection point on the switchable glass 50 to be detected.

In S311, the first unmanned aerial vehicle 20 adjusts the emitting component 206 to align the first unmanned aerial vehicle 20 with the detection point of the switchable glass 50 to be detected.

In S312, it is determined whether the emitting component 206 is successfully positioned to the detection point; if yes, S314 is performed; otherwise, S313 is performed.

In S313, it is determined whether the timer for locating to the detection point is expired out; if yes, S305 is performed to process the timeout fault; if no, S311 is performed to adjust the emitting component 206, so that the emitting component 206 is aligned with the detection point.

In S314, if the emitting component 206 successfully locates to the detection point, the first unmanned aerial vehicle 20 controls the laser emitter to generate a laser signal, and send the first indication information to the second unmanned aerial vehicle 30. The first indication information is used to indicate that the emitting component 206 has been positioned to the detection point.

In S315, the second unmanned aerial vehicle 30 receives the first indication information and adjusts its position, so that the laser receiver on the second unmanned aerial vehicle 30 can receive the laser signal sent by the laser emitter.

In S316, the second unmanned aerial vehicle 30 determines whether the laser receiver receives the laser signal, if yes, S318 is performed; otherwise, S317 is performed.

In S317, if the laser receiver does not receive the laser signal, the second unmanned aerial vehicle 30 further determines whether a timer for receiving the laser signal is expired or not; if yes, S305 is performed to process the timeout fault; if no, S315 is performed.

In S318, if the laser receiver receives the laser signal, the second unmanned aerial vehicle 30 locates the receiving component 303 to the detection point.

In S319, the first unmanned aerial vehicle 20 controls the emitting component 206 to emit the detection light, and the second unmanned aerial vehicle 30 adjusts the position of the receiving component 303 to receive the detection light.

In S320, the second unmanned aerial vehicle 30 determines whether three light-entrance apertures all receive light rays, if yes, S322 is performed; otherwise, S321 is performed.

In S321, the second unmanned aerial vehicle 30 fine-tunes the receiving component so that all three light-entrance apertures can receive the corresponding light ray.

This step may also be implemented by finely adjusting the emitting component 206 of the first unmanned aerial vehicle 20.

In S322, the second unmanned aerial vehicle 30 calculates the transmittance of the switchable glass 50 to be detected, and sends the transmittance to the dimming device.

In S323, the dimming device receives the transmittance and determines whether the transmittance is consistent with the target transmittance.

In S324, if the transmittance is inconsistent with the target transmittance, the dimming device adjust the voltage applied to the switchable glass 50 to be detected, so that the transmittance of the switchable glass 50 to be detected is consistent with the target transmittance.

In S325, if the transmittance of the switchable glass 50 to be detected is consistent with the target transmittance, the dimming device 40 sends indication information to the master computer 10.

In S326, the dimming system 100 detects and adjusts the transmittance of other switchable glasses that have not yet been detected.

With this step, the dimming method ends.

It will be noted that, the above dimming method is only a specific example provided by the embodiments of the present disclosure, and does not constitute a limitation to the present disclosure. It will be readily understood that, there may be multiple dimming methods applied to the dimming system provided by the embodiments of the present disclosure. For details, reference may be made to the foregoing description of the first unmanned aerial vehicle, the second unmanned aerial vehicle, and the dimming device.

Those skilled in the art will understand that the discussion of any of the above embodiments is merely exemplary and is not intended to imply that the scope of the disclosure (including the claims) is limited to these examples. Within the idea of the present disclosure, technical features in the above embodiments or different embodiments may also be combined, steps may be implemented in any order. There are many other variations in different aspects of the present disclosure as described above, which are not provided in the details for the sake of brevity.

In addition, in order to simplify the description and discussion, and not to obscure the present disclosure, well-known power/ground connections to integrated circuit (IC) chips and other components may or may not be shown in the provided drawings. In addition, the apparatus may be shown in a block diagram to avoid obscuring the disclosure. The fact is also taken into account that the details of the implementation of these apparatuses shown in a block diagram are highly dependent on the platform in which the disclosure will be implemented (that is, these details should be completely within the understanding of those skilled in the art). When specific details (e.g., circuits) are illustrated to describe exemplary embodiments of the present disclosure, it will be apparent to those skilled in the art that the disclosure may also be implemented without these specific details or with variations of these specific details. Therefore, these descriptions should be considered as illustrative instead of restrictive.

Although the present disclosure has been described in combination with specific embodiments thereof, many alternatives, modifications, and variations of these embodiments will be apparent to those skilled in the art according to the foregoing description.

The embodiments of the present disclosure are intended to cover all alternatives, modifications, and variations that fall within the broad scope of the appended claims. Therefore, any omissions, modifications, equivalent substitutions, improvements, and the like that are made within the spirit and scope of the present disclosure shall be included in the scope of the present disclosure.

What is claimed is:

1. A first unmanned aerial vehicle comprising:
an emitting component disposed on a main body of the first unmanned aerial vehicle;

a first wireless communications component configured to establish a communications connection to a master computer, and receive a first planned route sent by the master computer;

a first controller configured to:
control, according to the first planned route, the first unmanned aerial vehicle to fly to a first side of a switchable glass to be detected;
control the first unmanned aerial vehicle to fly to a same height as a detection point of the switchable glass to be detected; and
control the emitting component to emit a detection light to the detection point; wherein
the emitting component includes three light-exit apertures, and the three light-exit apertures are configured to emit three parallel light rays; and
a permanent magnet disposed on the emitting component; wherein
the permanent magnet is configured to align the emitting component with a receiving component after an electromagnetic coil disposed on the receiving component is energized; and
the first controller is further configured to control the emitting component to move to the detection point before the emitting component is controlled to emit the detection light to the detection point.

2. The first unmanned aerial vehicle according to claim 1, wherein the first wireless communications component is further configured to:
establish a communications connection to a second unmanned aerial vehicle; and
send first indication information to the second unmanned aerial vehicle after the emitting component moves to the detection point, wherein the first indication information is used to indicate that the emitting component has been positioned to the detection point.

3. The first unmanned aerial vehicle according to claim 1, further comprising a transmission mechanism connecting the emitting component to the main body of the first unmanned aerial vehicle;
wherein the first controller being configured to control the emitting component to move to the detection point includes:
the first controller being configured to control the transmission mechanism to drive the emitting component to move to the detection point.

4. The first unmanned aerial vehicle according to claim 1, further comprising:
a first camera configured to collect an image of the switchable glass to be detected, wherein
the first controller is further configured to determine coordinates of the detection point according to the image.

5. The first unmanned aerial vehicle according to claim 1, further comprising:
a laser emitter configured to generate a laser signal after the first unmanned aerial vehicle flies to the same height as the detection point.

6. The first unmanned aerial vehicle according to claim 1, wherein the first side is an indoor side of the switchable glass to be detected.

7. A second unmanned aerial vehicle comprising:
a receiving component disposed on a main body of the second unmanned aerial vehicle;
a second wireless communications component configured to establish communications connections to a master computer and a dimming device, and receive a second planned route sent by the master computer; and
a second controller configured to:
control, according to the second planned route, the second unmanned aerial vehicle to fly to a second side of a switchable glass to be detected;
control the second unmanned aerial vehicle to fly to a same height as a detection point of the switchable glass to be detected; and
obtain a transmittance of the switchable glass to be detected after determining that the receiving component receives a detection light, wherein
the second wireless communications component is further configured to send the transmittance of the switchable glass to be detected to the dimming device;
the detection light includes three parallel light rays, the receiving component includes three light-entrance apertures; and
the second controller being configured to obtain the transmittance of the switchable glass to be detected after determining that the receiving component receives the detection light includes: the second controller being configured to obtain the transmittance of the switchable glass to be detected after determining that each of the three light-entrance apertures receives a corresponding light ray of the three parallel light rays;
an electromagnetic coil disposed on the receiving component, wherein the electromagnetic coil is configured to generate a magnetic field after energized; and
the second controller is further configured to:
control the receiving component to move to a detection point of the switchable glass to be detected, after the second unmanned aerial vehicle flies to the same height as the detection point;
control a power supply of the second unmanned aerial vehicle to supply current to the electromagnetic coil after determining that each of the three light-entrance apertures receives the corresponding light ray of the three parallel light rays, and
control the power supply to stop supplying current to the electromagnetic coil after obtaining the transmittance of the switchable glass to be detected.

8. The second unmanned aerial vehicle according to claim 7, wherein the second wireless communications component is further configured to:
establish a communications connection to a first unmanned aerial vehicle; and
receive first indication information sent by the first unmanned aerial vehicle,
wherein the first indication information is used to indicate that an emitting component has been positioned to the detection point of the switchable glass to be detected;
the second controller being configured to control the second unmanned aerial vehicle to fly to the same height as the detection point includes:
the second controller being configured to control the second unmanned aerial vehicle to fly to the same height as the detection point after the second wireless communications component receives the first indication information.

9. The second unmanned aerial vehicle according to claim 8, further comprising:
a second camera configured to collect an image of the first unmanned aerial vehicle, wherein
the second controller is further configured to: determine a position of the first unmanned aerial vehicle according to the image of the first unmanned aerial vehicle.

10. The second unmanned aerial vehicle according to claim 9, further comprising:
a laser receiver configured to receive a laser signal, wherein
the second controller being configured to control the second unmanned aerial vehicle to fly to the same height as the detection point includes:
the second controller being configured to:
control the second unmanned aerial vehicle to fly to a same height as the first unmanned aerial vehicle according to the position of the first unmanned aerial vehicle; and
adjust a position of the second unmanned aerial vehicle until the laser receiver receives the laser signal.

11. The second unmanned aerial vehicle according to claim 7, wherein the second side is an outdoor side of the switchable glass to be detected.

12. A dimming device for a switchable glass, comprising:
a third wireless communications component configured to:
establish communications connections to a master computer and a second unmanned aerial vehicle; and
receive a target transmittance sent by the master computer and a transmittance of a switchable glass to be detected sent by the second unmanned aerial vehicle; and
a third controller configured to adjust a voltage applied to the switchable glass to be detected when the transmittance of the switchable glass to be detected is inconsistent with the target transmittance, so that the transmittance of the switchable glass to be detected is consistent with the target transmittance;
wherein the second unmanned aerial vehicle comprising:
a receiving component disposed on a main body of the second unmanned aerial vehicle;
a second wireless communications component configured to establish communications connections to a master computer and the dimming device, and receive a second planned route sent by the master computer; and
a second controller configured to:
control, according to the second planned route, the second unmanned aerial vehicle to fly to a second side of the switchable glass to be detected;
control the second unmanned aerial vehicle to fly to a same height as a detection point of the switchable glass to be detected; and
obtain a transmittance of the switchable glass to be detected after determining that the receiving component receives a detection light, wherein
the second wireless communications component is further configured to send the transmittance of the switchable glass to be detected to the dimming device;
the detection light includes three parallel light rays, the receiving component includes three light-entrance apertures; and
the second controller being configured to obtain the transmittance of the switchable glass to be detected after determining that the receiving component receives the detection light includes: the second controller being configured to obtain the transmittance of the switchable glass to be detected after determining that each of the three light-entrance apertures receives a corresponding light ray of the three parallel light rays;
an electromagnetic coil disposed on the receiving component, wherein the electromagnetic coil is configured to generate a magnetic field after energized; and
the second controller is further configured to:
control the receiving component to move to a detection point of the switchable glass to be detected, after the second unmanned aerial vehicle flies to the same height as the detection point;
control a power supply of the second unmanned aerial vehicle to supply current to the electromagnetic coil after determining that each of the three light-entrance apertures receives the corresponding light ray of the three parallel light rays, and
control the power supply to stop supplying current to the electromagnetic coil after obtaining the transmittance of the switchable glass to be detected.

13. The dimming device according to claim 12, wherein the third wireless communications component is further configured to: send second indication information to the master computer after the transmittance of the switchable glass to be detected is adjusted to be consistent with the target transmittance, wherein the second indication information is used to indicate that the switchable glass to be detected has been adjusted.

14. The dimming device according to claim 12, wherein the third wireless communications component is further configured to: send third indication information to the master computer when the transmittance of the switchable glass to be detected is consistent with the target transmittance, wherein the third indication information is used to indicate that the transmittance of the switchable glass to be detected is consistent with the target transmittance.

15. The dimming device according to claim 12, further comprising:
a memory configured to store the target transmittance and a first voltage corresponding to the target transmittance; wherein the first voltage is a voltage applied to the switchable glass to be detected when the transmittance of the switchable glass to be detected is adjusted to be the target transmittance.

16. The dimming device according to claim 15, wherein the memory is an electrically erasable programmable read-only memory.

* * * * *